United States Patent [19]

Lee et al.

[11] Patent Number: 5,774,630
[45] Date of Patent: Jun. 30, 1998

[54] PARAMETER SET UP METHOD OF MEMBERSHIP FUNCTIONS FOR FUZZY CONTROL OF WASHING MACHINE MOTOR

[75] Inventors: Jae-Bong Lee, Seoul; Ji-Hyun Kim, Suwon, both of Rep. of Korea

[73] Assignee: SamSung Electronics Co., Ltd., Suwon, Rep. of Korea

[21] Appl. No.: 751,430

[22] Filed: Nov. 20, 1996

[30]     Foreign Application Priority Data

Nov. 21, 1995 [KR]  Rep. of Korea ................... 1995-42480
Nov. 5, 1996  [KR]  Rep. of Korea ................... 1996-52028

[51] Int. Cl.$^6$ ................................................ G06F 15/18
[52] U.S. Cl. ................................ 395/13; 395/3; 395/900
[58] Field of Search ................................. 395/3, 10, 50, 395/13, 61, 76, 900, 904; 62/80; 348/364; 68/12.04

[56]              References Cited

U.S. PATENT DOCUMENTS

| 5,111,301 | 5/1992  | Haruki et al. ............................ 348/364 |
| 5,230,227 | 7/1993  | Kondosh et al. ....................... 68/12.02 |
| 5,230,228 | 7/1993  | Nakano et al. ......................... 68/12.04 |
| 5,235,827 | 8/1993  | Kiuchi et al. ........................... 68/12.04 |
| 5,272,892 | 12/1993 | Janutka et al. ......................... 68/12.02 |
| 5,619,614 | 4/1997  | Payne et al. ................................ 395/3 |
| 5,673,565 | 10/1997 | Jeong et al. ................................ 62/80 |

FOREIGN PATENT DOCUMENTS

| 0385387 A2  | 5/1990 | European Pat. Off. ........... G06J 1/00 |
| WO 92/00562 | 1/1992 | WIPO ............................... G06F 9/44 |
| WO 96/02880 A1 | 2/1996 | WIPO ............................... G06F 7/60 |

OTHER PUBLICATIONS

Ng et al, "Design of Sophisticated fuzzy logic controllers using genetic algorithms," Proceedings of the Third IEEE Conference on Fuzzy systems, pp. 1708–1712 vol. 3, Jun. 1994.

Hsu et al, "Advanced genetic algorithms applied in MRFACS for fuzzy rules set optimization," IECON '94, pp. 1407–1412 vol. 2, Sep. 1994.

Ashrafzadeh et al, "A self–organizing and self–tuning fuzzy logic controller for field oriented control of induction motor drives," IAS '95, pp. 1656–1662 vol. 2, Oct. 1995.

Schwartz et al, "Applications of fuzzy sets and approximated reasoning," Proceedings of the IEEE, vol. 82, No. 4, pp. 482–498, Apr. 1994.

*Primary Examiner*—Tariq R. Hafiz
*Attorney, Agent, or Firm*—Burns, Doane, Swecker & Mathis, L.L.P.

[57]              ABSTRACT

The present invention is disclosed to provide a parameter set-up method for a membership function of fuzzy control in a washing machine by which time and manpower necessary for design of a product can be reduced, an accurate design of the product can be made possible and performance of the product can be improved. The method includes the steps of: providing an auxiliary fuzzy logic controller having M parameters in a controller membership function as input and an error between a rotary speed of a washing machine motor and a reference speed as output (first step); classifying the M parameters into N respective sections and generating a fuzzy rule for the auxiliary fuzzy logic controller through $N^M$ experiments (second step); obtaining through the experiments an error between an output curve and a reference curve which is a graph of a sampling time versus a rotary speed of the motor (third step); utilizing the error between the output curve and the reference curve to execute a first genetic algorithm so that the parameters of the auxiliary fuzzy logic controller can be optimized (fourth step); and executing a second genetic algorithm against the parameters of the auxiliary fuzzy logic controller to minimize the error between the output curve and the reference curve output from the auxiliary fuzzy logic controller so that parameters of the fuzzy logic controller can be obtained (fifth step).

1 Claim, 7 Drawing Sheets

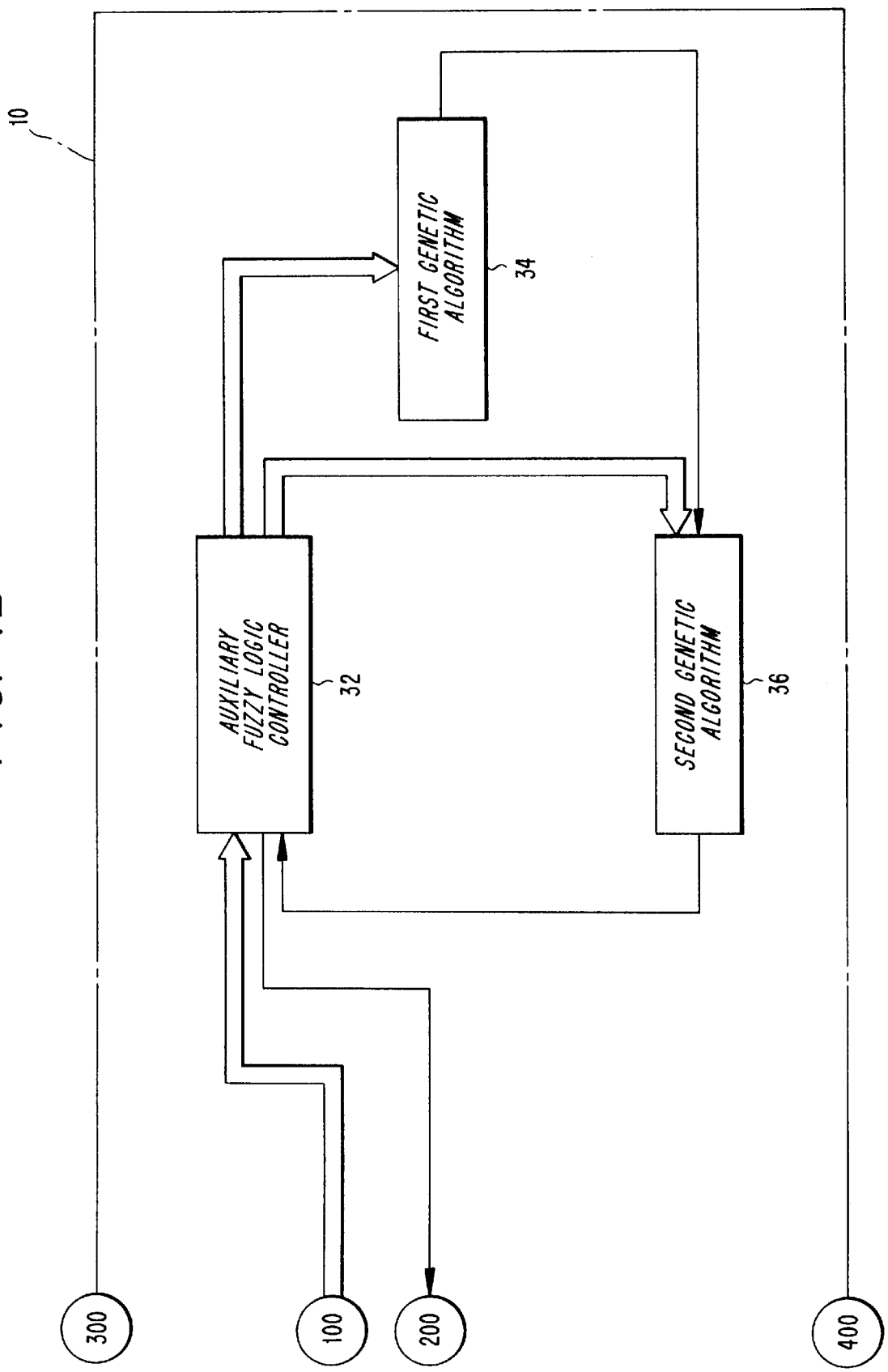

PARAMETER SET UP METHOD OF MEMBERSHIP FUNCTIONS FOR FUZZY CONTROL OF WASHING MACHINE MOTOR

BACKGROUND OF THE INVENTION

1. Field of the Invention

The present invention relates to a parameter set-up method of a membership function for fuzzy control of a washing machine motor, and more particularly to a parameter set-up method of a membership function for fuzzy control of a washing machine motor for obtaining a parameter of membership function by way of genetic algorithm.

2. Description of the Prior Art

Generally, many experiments are repeated to set up a parameter of a membership function when a washing machine motor is fuzzy-controlled. Accordingly, there have been problems in that many hours and manpower are needed for product design.

In other words, as illustrated in FIG. 1, when a Hall effect sensor for detecting rotation of a washing machine motor detects the flux of a magnet piece secured to a motor axis to thereby detect a rotary speed of a motor, a present speed can be determined based on a difference between a desired speed and a current rotary speed of a motor, wherein the present speed is input as one value for a control fuzzy logic system.

Furthermore, an increased portion of the present speed is detected based on a difference between the present speed and an erstwhile speed and an increment thereof is input as another value for the control fuzzy logic system.

Therefore, in the control fuzzy logic system, a fuzzy operation is performed based on the above two inputs and outputs a phase control value to thereby control a washing machine motor.

As illustrated in FIG. 2, an input/output membership function can be constituted based on a fuzzy rule formed by an expert or an experienced person about the inputs "v" and "d" of the control fuzzy logic system.

The fuzzy rule and the output value are as follows:

if $v = NB$ and $d = IB$ then $0 = ONB$     $-m0 < M1 < -m1$
if $v = NB$ and $d = IS$ then $0 = OND$     $-m2 < M2 < -m3$
if $v = NS$ and $d = IB$ then $0 = ONB$
if $v = NS$ and $d = IS$ then $0 = ONS$ $$\text{output value } f(0) = \frac{\mu v^{NB}(M1) \cdot \mu d^{IB}(M2) \cdot Oo + \mu v^{NB}(M1) \cdot \mu d^{IS}(M2) \cdot Oo + \mu v^{NS}(M1) \cdot \mu d^{IB}(M2)}{\mu v^{NB}(M1) \cdot \mu d^{IB}(M2) + \mu v^{NB}(M1) \cdot \mu d^{IS}(M2) + \mu v^{NS}(M1)} $$

$$\frac{Oo + \mu v^{NS}(M1) \cdot \mu d^{IS}(M2) \cdot O1}{\mu d^{IB}(M2) + \mu v^{NS}(M1) \cdot \mu d^{IS}(M2)}$$

The above output value is a phase variation of a motor supply current, by which the washing machine motor is controlled.

On the other hand, FIG. 2A represents a graph for illustrating a fuzzy set against the present speed (V) of the motor in a fuzzy logic controller, FIG. 2B is a graph for illustrating a fuzzy set against the present speed increment (d) in a fuzzy logic controller, and FIG. 2C depicts a graph illustrating a fuzzy set against a phase variation (o) of current supply per time output from a fuzzy logic controller.

In FIG. 2A, reference symbol NB (Negative Big) represents that a present speed of a motor is "much slower" than a reference speed, NS (Negative Small) defines that the present speed of the motor is "a little slower" than the reference speed, ZO (Zero) means that the present speed is identical to the reference speed, PS (Positive Small) shows that the present speed is "a little faster" than the reference speed and PB (Positive Big) represents that the present speed is "much faster" than the reference speed.

In FIG. 2B, reference symbol IB (Increment Big) defines that a speed variation of the motor has "increased much", IS (Increment Small) represents that the speed variation has "increased a little", DO (Decrement Zero) shows that the speed variation "remains unchanged", DS (Decrement Small) means that the speed variation has "decreased a little" and DB (Decrement Big) means that the speed variation has "decreased much".

In FIG. 2C, reference symbol ONB (Output Negative Big) represents that "an output has decreased a lot" against a phase variation of supply current provided to the motor, ONS (Output Negative Small) defines that "the output has decreased a little" against the phase variation of supply current provided to the motor, OZO (Output Zero) shows that "the output remains unchanged" against the phase variation of supply current, OPS (Output Positive Small) defines that "the output has increased a little" against the phase variation of the supply current and OPB (output Positive Big) represents that "the output has increased a lot" against the phase variation of the supply current.

Meanwhile, a rule fit for environment should be formed in order to maintain a washing machine motor at a desired speed utilizing the control fuzzy logic system. However, it is difficult to determine the rule by way of a conventional experiment when an output function varies to a great extent per short period of time.

In other words, it is very difficult to determine a rule in a time delay system and a parameter (m0–m3) of an input membership function as in a washing machine motor.

As a result, it is realistically impossible to accurately obtain a fuzzy rule and a parameter of input membership function in order to accurately control a motor.

SUMMARY OF THE INVENTION

Accordingly, the present invention is disclosed to solve the aforementioned problems and it is an object of the present invention to provide a parameter set-up method for a membership function for fuzzy control of a washing machine motor whereby the time and manpower needed for design of a product can be reduced, the product can be accurately designed and at the same time, performance of the product can be improved.

In accordance with objects of the present invention, there is provided a parameter set-up method for a membership function for fuzzy control of a washing machine motor, the method comprising the steps of:

providing an auxiliary fuzzy logic controller having with M number of parameters in a membership function for a fuzzy logic controller as input, wherein an error between a rotary speed of a washing machine motor and a reference speed as output (first step);

classifying the M number of parameters into N number of respective sections and generating a fuzzy rule of the auxiliary fuzzy logic controller through $N^M$ experiments (second step);

obtaining through the experiments an error between an output curve and a reference curve which is a graph showing a sampling time versus a rotary speed of the motor (third step);

utilizing the error between the output curve and the reference curve to thereby execute a first genetic algorithm so that the parameters of the auxiliary fuzzy logic controller can be optimized (fourth step); and executing a second genetic algorithm against the parameters of the auxiliary fuzzy logic controller to thereby minimize the error between the output curve and the reference curve output from the auxiliary fuzzy logic controller so that parameters of the fuzzy logic controller can be obtained (fifth step).

BRIEF DESCRIPTION OF THE DRAWINGS

For fuller understanding of the nature and objects of the invention, reference should be made to the following detailed description taken in conjunction with the accompanying drawings in which:

FIGS. 4A and 4B are control block diagrams of a parameter establishing apparatus for the membership function for fuzzy control of the washing machine motor.

DETAILED DESCRIPTION OF THE INVENTION

The embodiment of the present invention will now be described in detail with reference to the accompanying drawings.

Figure 1:
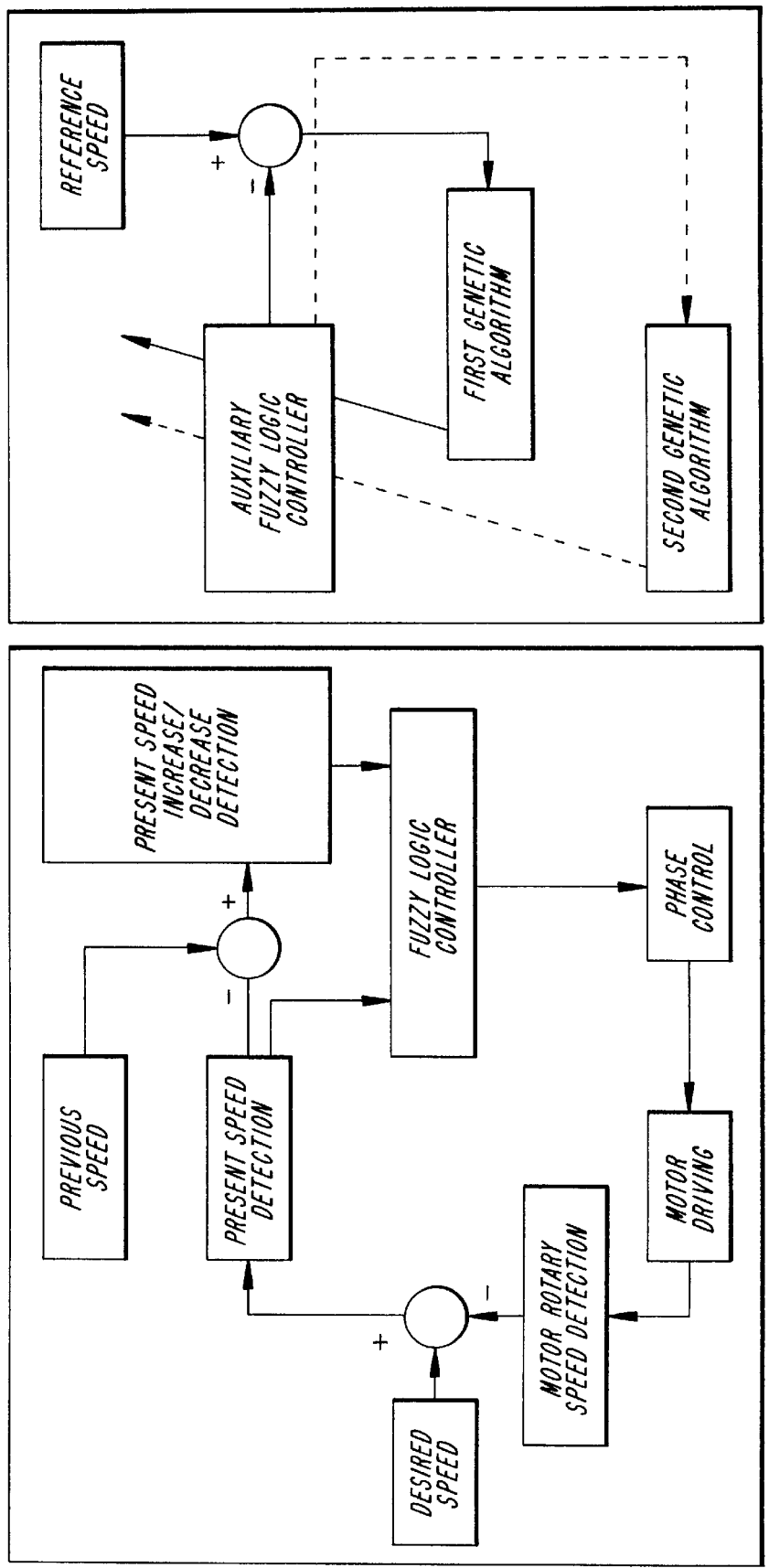
FIG. 1 is a block diagram of a conventional genetic algorithm fuzzy system.
Figure 2A:
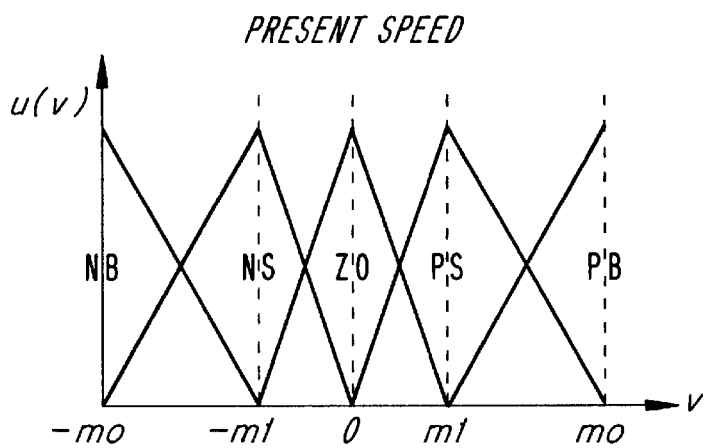
FIGS. 2A, 2B and 2C are graphs illustrating membership functions of the fuzzy logic controller shown in FIG. 1.
Figure 2B:
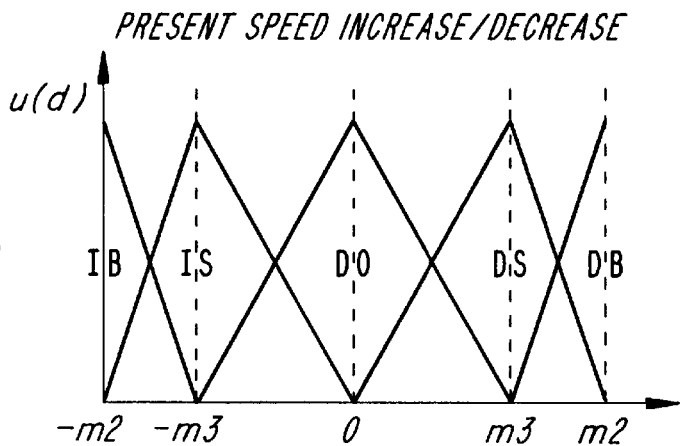
Figure 2C:
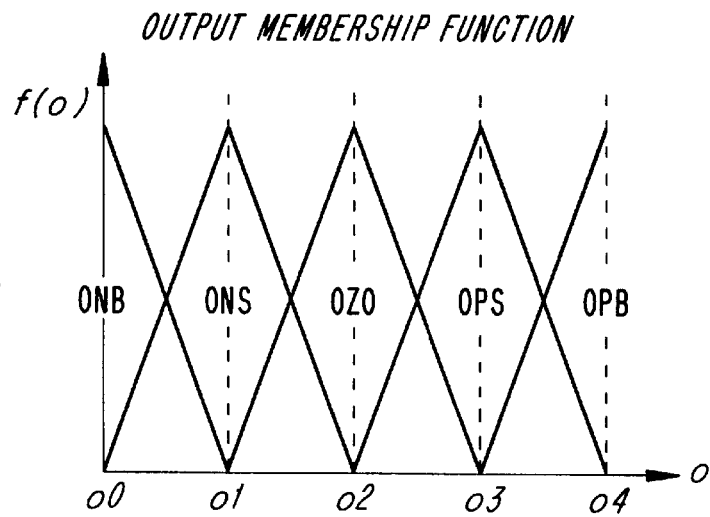
Figure 3:
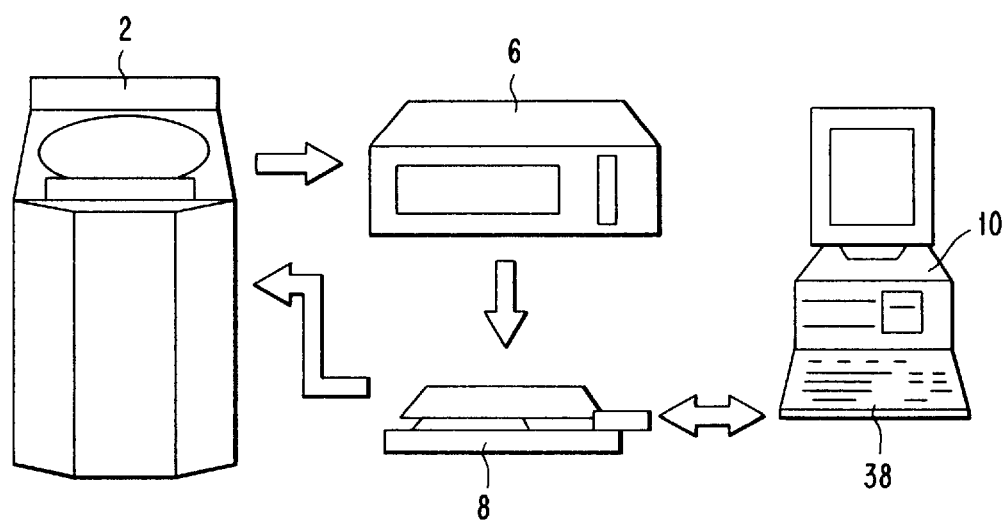
FIG. 3 is a block diagram illustrating a parameter establishing apparatus of a membership function for fuzzy control of a washing machine motor according to one embodiment of the present invention.

FIG. 3 is a block diagram for illustrating a parameter establishing apparatus for membership functions for fuzzy control of a washing machine motor according to one embodiment of the present invention.

As shown in FIG. 3, a washing machine 2 has disposed therein a frequency-voltage converter 6 for converting a rotary frequency of a motor 4 provided therein to voltage. A multi input/output board 8 is provided for converting analog voltage output from the frequency-voltage converter 6 to a digital signal, and a personal computer 10 for is used receiving data about a rotary condition of the motor 4 (not shown) in the washing machine 2 from the multi input/output board 8 to thereby establish a parameter value of a membership function for fuzzy control of the motor 4.

Figure 4A:
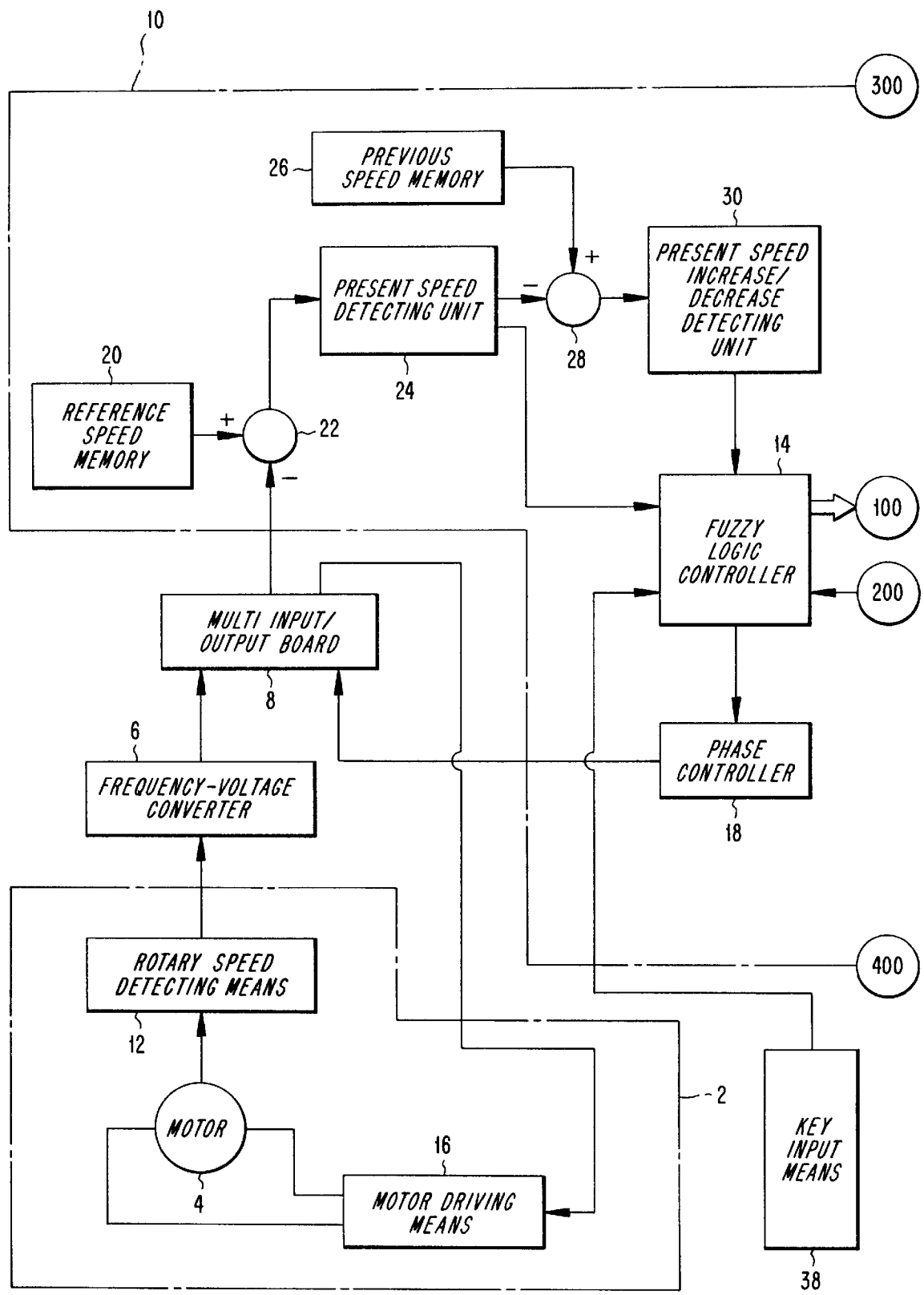

FIG. 4 illustrates a control block diagram of a parameter establishing apparatus for a membership function for fuzzy control of a washing machine motor.

As illustrated in FIG. 4, the motor 4 is provided for rotating a spin-dry tub and driving a pulsator in the washing machine 2. The motor 4 is arranged at a periphery of the washing machine 2 with rotary speed detecting means 12 detecting a rotational speed of the motor 4.

The rotary speed detecting means 12 is a Hall sensor that senses a magnetic force from a magnet (not shown) disposed on a rotary axis of the motor 4 to thereby detect revolution of the motor 4.

The rotary speed detecting means 12 is connected with the frequency-voltage converter 6 to convert the rotary frequency output from the rotary speed detecting means 12 to a voltage.

The personal computer 10 includes: a fuzzy logic controller (FLC 14) for controlling the speed of the motor 4 at a desired level; a phase controller 18 for receiving a control signal output from the fuzzy logic controller 14 to supply a phase control signal to motor driving means 16; a reference speed memory 20 for receiving a reference speed from the fuzzy logic controller 14 for storing a reference speed of the motor 4; a first comparator 22 for comparing a voltage corresponding to the reference speed output from the reference speed memory 20 with a voltage corresponding to a present speed of the motor 4 output from the frequency-voltage converter 6 to thereby obtain an error between the reference speed and the present speed of the motor 4; a present speed detecting unit 24 for detecting a present speed of the motor based on the error between the reference speed output from the first comparator 22 and the present speed of the motor 4; an erstwhile speed memory 26 for storing a previous speed of the motor 4 output from the fuzzy logic controller 14, a second comparator 28 for comparing the previous speed of the motor 4 output from the erstwhile speed memory 26 with the present speed of the motor 4 output form the present speed detecting unit 24 to thereby obtain a difference between the previous speed and the present speed a present speed increase/decrease detecting unit 30 for detecting an increase or a decrease status of the present speed based on the difference between the previous speed and the present speed of the motor 4 output from the second comparator 28; an auxiliary fuzzy logic controller 32 for generating an auxiliary parameter for establishing a parameter based on membership parameter function versus a fuzzy control output from the fuzzy logic controller 14; a first genetic algorithm unit 34 for performing a genetic algorithm against the auxiliary parameter to optimize the auxiliary parameter based on the auxiliary parameter output from the auxiliary fuzzy logic controller 32; and a second genetic algorithm unit 36 for performing a genetic algorithm against the optimized auxiliary parameter output from the first genetic algorithm to establish a parameter of the fuzzy logic controller 14 so that an error between the reference speed of the motor 4 and the present speed thereof can be minimized. The auxiliary fuzzy logic controller 32 is constructed as a fuzzy logic controller, wherein an input thereto is parameter (m0–m3) of the fuzzy logic controller while output therefrom is an error value between an output speed and a reference speed of a motor.

A rule necessary for fuzzy operation is created according to an error between a rotary speed of the motor obtained by applying a representative value of the parameter to a membership function of an actual fuzzy logic controller, and a reference curve, so as to represent the fuzzy logic controller with the auxiliary fuzzy logic controller 32.

Once the auxiliary fuzzy logic controller 32 is constructed, the first genetic algorithm unit 34 serves to optimize parameters of a new fuzzy membership function constructed in the auxiliary fuzzy logic controller 32 to thereby reinforce the previously-established auxiliary fuzzy logic controller 32.

FIGS. 5A–5E illustrate graphs of membership functions in the auxiliary fuzzy logic controller 32.

A first genetic algorithm serves to optimize the parameters of membership function in the auxiliary fuzzy logic controller at P00, P01–P33, P34.

A second genetic algorithm is executed by utilizing the auxiliary fuzzy logic controller 32 reinforced as a result of the first genetic algorithm. The second genetic algorithm is to have input values (m0–m3) which serve to minimize output values.

Figure 5A:
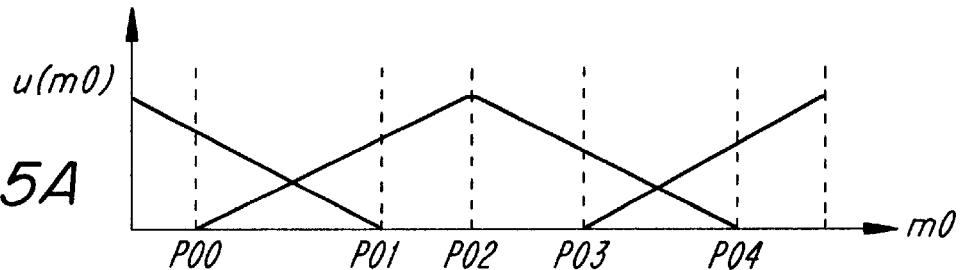
FIGS. 5A to 5E are graphs illustrating membership functions of an auxiliary fuzzy logic controller in a control apparatus of the washing machine motor illustrated in FIG. 4.

FIG. 5A is a graph illustrating a fuzzy set against a parameter (m0) of a membership function in the fuzzy logic controller 14 of the auxiliary fuzzy logic controller 32.

Figure 5B:
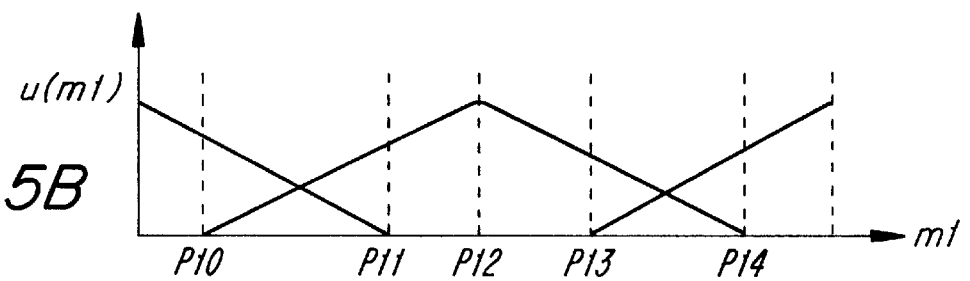
Figure 5C:
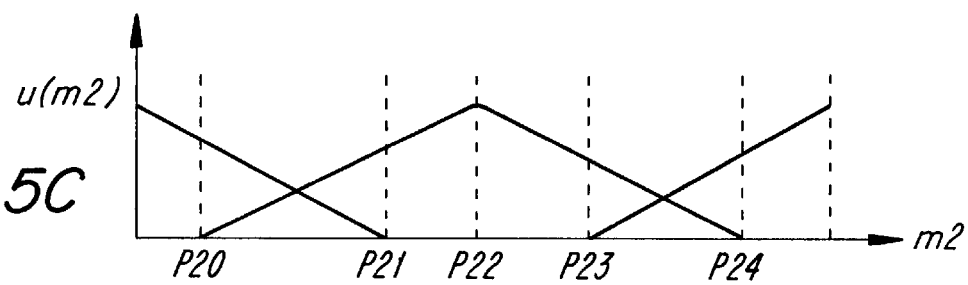
Figure 5D:
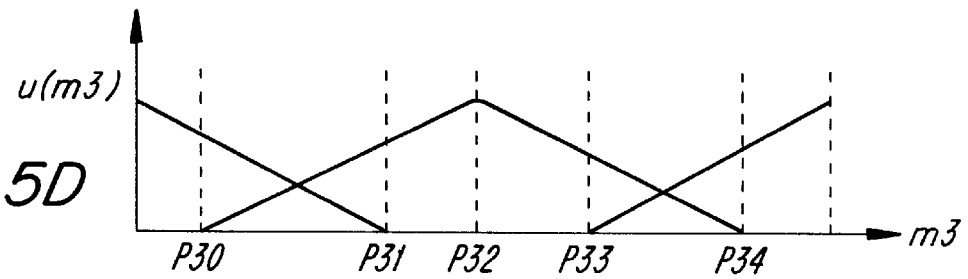
Figure 5E:
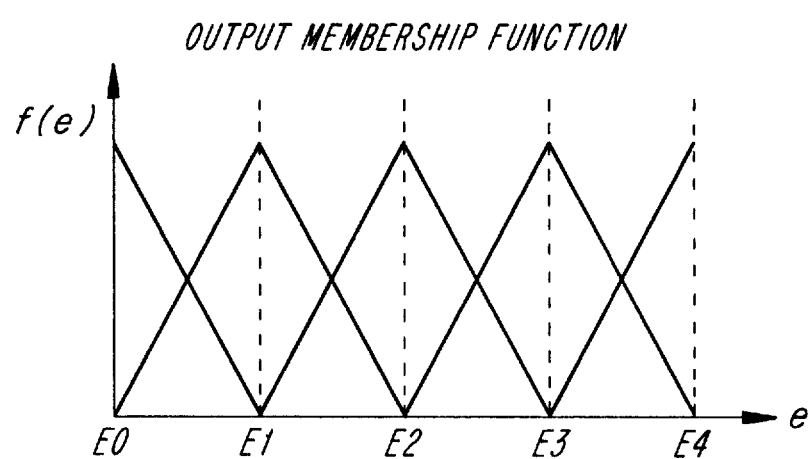

FIG. 5B represents a graph illustrating a fuzzy set for a parameter (m1) of a membership function in the fuzzy logic controller 14 of the auxiliary fuzzy logic controller 32, FIG. 5C is a graph illustrating a fuzzy set for a parameter (m2) of a membership function in the fuzzy logic controller 14 of the auxiliary fuzzy logic controller 32, FIG. 5D is a graph illustrating a fuzzy set for a parameter (m3) of a membership function in the fuzzy logic controller 14 of the auxiliary fuzzy logic controller 32, and FIG. 5E is a graph illustrating a fuzzy set for parameters (m0, m2, m2, m3) of a membership function of the fuzzy logic controller 32 to the fuzzy logic controller 14.

Here, respective membership functions of the auxiliary fuzzy logic controller 32 in FIGS. 5A–5E are divided into 3 sectional representative values and 3 times (81) experiments are performed against 4 input variations, experimental data of an output waveform (rotary speed waveform of the motor) is obtained based on parameter value of the fuzzy control logic controller by varying the representative values at the section to the washing machine motor and substituted thereinto.

The obtained data is an error value represented in a difference in a reference curve.

Each experiment serves to yield a fuzzy rule which in turn becomes a rule of the auxiliary fuzzy logic controller 32.

The first genetic algorithm serves to optimize parameter values (P00, P01–P33, P34) of the input membership function in FIGS. 5A–5E based on the fuzzy rule and the error value obtained therefrom.

The goal is to optimize P00–P34 to thereby cause the auxiliary fuzzy logic controller 32 to represent the fuzzy logic controller more accurately.

Fitness functions in the performance of the first genetic algorithm and reproduction probability during reproduction are:

$$\text{Fitness} = \frac{1}{1 + \sum_{i=1}^{81} |\text{error}_i|}, \quad (2)$$

$$\text{error}_i = E_i - F_i \quad (3)$$

$$E_i = |\text{Reference}_i - \text{Sample}_i|, \quad (4)$$

$$F_i = \frac{\sum_{i=1}^{81} Mei}{\sum_{i=1}^{81} M} \quad (5)$$

$$M = \prod_{j=0}^{3} \mu ij \, (Pjo, Pj1, Pj2, Pj3, Pj4) \quad (6)$$

$$\text{Reproduction probability} = \frac{\text{Fitness}_1}{\sum_{j=1}^{1} \text{Fitness}_j} \quad (7)$$

The second genetic algorithm is to obtain input values (m0–m3) from the auxiliary fuzzy logic controller for minimizing output values in the auxiliary fuzzy logic controller 32 optimized by the first genetic algorithm. The fitness function is as follows:

$$\text{Fitness}_i = \frac{1}{1 + fi(m0, m1, m2, m3)} \quad (8)$$

Now, in connection with parameter establishing apparatus of a membership function for fuzzy control of a washing machine motor thus constructed, a parameter establishing method of membership function for fuzzy control of the washing machine motor according to the embodiment of the present invention will be described.

First of all, as an initial condition for operational explanation, it is assumed that the fuzzy logic controller 14 is pre-established with a reference speed of the motor 14, where a speed is given by way of example is 2,000 RPM.

When operation is started, an electric power is supplied to the washing machine 2, frequency-voltage converter 6, multi input/output board 8 and to the personal computer 10.

Then, the reference speed of the motor 4 is generated according to the reference speed memory 20 and according to the present speed detecting unit 24 from the fuzzy logic controller 14, whereby the previous speed of the motor, by way of example, 0 RPM is output to the erstwhile speed memory 26 from the fuzzy logic controller 14.

When an operational start command is applied to the key input means 38, the command is output to the fuzzy logic controller 14.

A control signal is output to the phase control unit 18 from the fuzzy logic controller 14 and a motor driving control signal is generated to the motor driving means from the phase controller 18 through the multi input/output board 8.

Then, the motor 4 is supplied with driving voltage from the motor driving means 16 to thereby rotate the motor 4, where, the present speed of the motor can be detected by the rotary speed detecting means 12.

Next, a frequency corresponding to the present speed of the motor 4 is generated by the frequency-voltage converter 6 from the rotary speed detecting means 12, where the frequency-voltage converter 6 serves to convert the frequency to a voltage corresponding thereto and to output same to the first comparator 22.

At the same time, the reference speed of the motor 4 is supplied to the first comparator 22 from the reference speed memory 20.

Successively, the first comparator 22 compares the reference speed of the motor 4 with the present speed thereof, and a difference between a reference speed generated as a result of the comparison is output to the present speed detecting unit 24.

Under these circumstances, the present speed of the motor 4 is respectively output to the second comparator 28 and to the fuzzy logic controller 14 from the present speed detecting unit 24.

Simultaneously, the erstwhile speed memory 26 serves to output the previous speed of the motor 4 to the second comparator 28.

Successively, the second comparator 28 serves to compare the previous speed of the motor 4 with the present speed thereof, and a difference between the previous speed of the motor 4 generated as a result of comparison thereof and the present speed is generated to the present speed increase/decrease detecting unit 30.

Next, the present speed increase/decrease detecting unit 30 outputs to the fuzzy logic controller 14 an increased or a decreased status of the present speed of the motor 4.

In order to decrease a difference between the reference speed of the motor 4 and the present speed thereof based on the increased or decreased status of the present speed of the motor 4, a control signal is output from the fuzzy logic controller 14 to the phase controller 18 and at the same time, the fuzzy logic controller 14 serves to output to the auxiliary fuzzy logic controller 32 an initial value of the parameters (m0, m1, m2, m3) of the membership function for fuzzy control of the motor 4.

Successively, the auxiliary fuzzy logic controller 32 serves to classify a plurality (M) of parameters into N numbers of sections, respectively, and through $N^m$ times of experiments, a fuzzy rule of the auxiliary fuzzy logic controller 32 is generated. By way of example, M in the present embodiment can be 4 and N can be 3.

Next, the auxiliary logic controller 32 obtains an error between an output curve and a reference curve, which is a graph for illustrating a sampling time by way of experiments versus the rotary speed of the motor.

Successively, initial values of auxiliary parameters (P00, P01, P02, P03, P04) (P10, P11, P12, P13, P14) (P20, P21, P22, P23, P24) (P30, P31, P32, P33, P34) for establishing the parameters (m0, m1, m2, m3) are input to the first genetic algorithm unit 34, and yo the second genetic algorithm unit 36. From the auxiliary fuzzy logic controller 32.

At the same time, a difference value between the reference speed of the motor 4 and the present speed thereof is supplied to the first genetic algorithm unit 34, and to the second genetic algorithm unit 36, from the auxiliary fuzzy logic controller 32.

Under these circumstances, the first genetic algorithm unit 34 performs a genetic algorithm on the auxiliary parameters so that the auxiliary parameters (P00, P01, P02, P03, P04) (P10, P11, P12, P13, P14) (P20, P21, P22, P23, P24) (P30, P31, P32, P33, P34) can be optimized.

Next, values of optimized auxiliary parameters (P00, P01, P02, P03, P04) (P10, P11, P12, P13, P14) (P20, P21, P22, P23, P24) (P30, P31, P32, P33, P34) are supplied to the second genetic algorithm 36 from the first genetic algorithm 34.

The second genetic algorithm 36 performs the genetic algorithm on the optimized auxiliary parameters (P00, P01, P02, P03, P04) (P10, P11, P12, P13, P14) (P20, P21, P22, P23, P24) (P30, P31, P32, P33, P34) so as to minimize the error between the reference speed of the motor 4 and the present speed thereof, which allows the most appropriate values against the parameters (m0, m1, m2, m3) of the fuzzy logic controller 14 to be established.

Next, established values of parameters (m0, m1, m2, m3) of the fuzzy logic controller 14 are output to the auxiliary fuzzy logic controller 32 from the second genetic algorithm unit 36.

Successively, established values of the parameters (m0, m1, m2, m3) of the fuzzy logic controller 32 are output from the auxiliary fuzzy logic controller 32 to the fuzzy logic controller 14.

Accordingly, the fuzzy logic controller 32 serves to control the speed of the motor 4 according to the established values of the parameters (m0, m1, m2, m3).

As apparent from the foregoing, there is an advantage in the parameter establishing method of a membership function for fuzzy control of a washing machine motor according to the present invention, in that parameters of the membership function of fuzzy logic controller according to a genetic algorithm can be obtained to thereby decrease the time and manpower needed for product design and to accurately design the product for increased performance.

What is claimed is:

1. A parameter set-up method for a membership function for fuzzy control in a washing machine motor, the method comprising the steps of:

providing an auxiliary fuzzy logic controller having M parameters in a fuzzy logic controller membership function as input, and an error between a rotary speed of a washing machine motor and a reference speed as output;

classifying the M parameters into N respective sections and generating a fuzzy rule for the auxiliary fuzzy logic controller through $N^M$ experiments;

obtaining, through the experiments, an error between an output curve and a reference curve which error is a graph of a sampling time versus a rotary speed of the motor;

utilizing the error between the output curve and the reference curve to execute a first genetic algorithm so that the parameters of the auxiliary fuzzy logic controller can be optimized; and executing a second genetic algorithm against the parameters of the auxiliary fuzzy logic controller to thereby minimize the error between the output curve and the reference curve output from the auxiliary fuzzy logic controller to obtain parameters of the fuzzy logic controller.

\* \* \* \* \*